United States Patent [19]
Okude et al.

[11] Patent Number: 5,732,170
[45] Date of Patent: Mar. 24, 1998

[54] OPTICAL FIBER FILTER

[75] Inventors: Satoshi Okude; Tetsuya Sakai; Akira Wada; Ryozo Yamauchi, all of Sakura, Japan

[73] Assignee: Fujikura, Ltd., Tokyo, Japan

[21] Appl. No.: 734,709

[22] Filed: Oct. 21, 1996

[30] Foreign Application Priority Data

Oct. 23, 1995 [JP] Japan ................... 7-274551

[51] Int. Cl.⁶ .................................. G02B 6/26
[52] U.S. Cl. ................... 385/27; 385/28; 385/31; 385/37; 385/123; 385/124; 385/96; 385/98
[58] Field of Search .................. 385/27, 28, 29, 385/30, 31, 37, 123, 124, 141, 142, 96, 98

[56] References Cited

U.S. PATENT DOCUMENTS

| | | | |
|---|---|---|---|
| 3,909,110 | 9/1975 | Marcuse | 385/28 X |
| 4,474,427 | 10/1984 | Hill et al. | 385/123 X |
| 4,725,110 | 2/1988 | Glenn et al. | 385/37 X |
| 4,804,248 | 2/1989 | Bhagavatula | 385/28 X |
| 4,807,950 | 2/1989 | Glenn et al. | 385/37 X |
| 4,900,116 | 2/1990 | Mathis | 385/27 X |
| 4,974,931 | 12/1990 | Poole | 385/28 X |
| 4,976,512 | 12/1990 | Safaai-Jazi | 385/27 X |
| 5,042,897 | 8/1991 | Meltz et al. | 385/37 X |
| 5,048,913 | 9/1991 | Glenn et al. | 385/37 |
| 5,054,875 | 10/1991 | Curran | 385/27 |
| 5,061,032 | 10/1991 | Meltz et al. | 385/37 X |
| 5,104,209 | 4/1992 | Hill et al. | 385/27 |
| 5,216,739 | 6/1993 | Hill et al. | 385/123 |
| 5,301,252 | 4/1994 | Yanagawa et al. | 385/96 |
| 5,337,380 | 8/1994 | Darbon et al. | 385/28 |
| 5,351,321 | 9/1994 | Snitzer et al. | 385/10 |
| 5,367,588 | 11/1994 | Hill et al. | 385/37 |
| 5,416,862 | 5/1995 | Haas et al. | 385/28 |
| 5,457,759 | 10/1995 | Kalonji et al. | 385/31 |
| 5,457,760 | 10/1995 | Mizrahi | 385/37 |
| 5,530,710 | 6/1996 | Grubb | 385/27 X |
| 5,600,740 | 2/1997 | Asfar | 385/27 |
| 5,659,644 | 8/1997 | DiGiovanni et al. | 385/31 |

FOREIGN PATENT DOCUMENTS

| | | | |
|---|---|---|---|
| 0495605 | 7/1992 | European Pat. Off. | 385/123 X |
| 0629885 | 12/1994 | European Pat. Off. | 385/37 X |
| 02167507 | 6/1990 | Japan | 385/123 X |
| 3118504 | 5/1991 | Japan | 385/123 X |
| 3274509 | 12/1991 | Japan | 385/123 X |

OTHER PUBLICATIONS

Victor Mizrahi and J.E. Sipe, "Optical Properties of Photosensitive Fiber Phase Gratings", Journal of Lightwave Technology, vol. 11, No. 10, pp. 1,513–1,517, Oct. 1993.

E. Delevaque et al., "Optical fiber design for strong gratings photoimprinting radiation mode suppression", Optical Fiber Communications Conference, pp. PD5–1 –PD5–5, Apr. 1995.

*Primary Examiner*—Brian Healy
*Attorney, Agent, or Firm*—Sprung Kramer Schaefer & Briscoe

[57] ABSTRACT

The present invention relates to an optical fiber filter provided with a portion which selectively reflects or transmits light of a specific wavelength, this portion comprised of a multimode optical fiber in which the refractive index of the core changes periodically along the longitudinal direction thereof. Furthermore, this multimode optical fiber has an input end and an output end, with at least the input end of the multimode optical fiber being connected to a single mode optical fiber. As a result of forming an optical fiber filter in this way, it is possible to realize an optical fiber filter that exhibits no transmission loss at wavelengths other than the center wavelength.

22 Claims, 14 Drawing Sheets

OPTICAL FIBER FILTER

BACKGROUND OF THE INVENTION

1. Field of the Invention

The present invention relates to an optical fiber filter, and particularly, to a optical fiber filter in which there is no transmission loss at wavelengths other than the center wavelength.

2. Description of the Related Art

Optical fiber filters are optical devices which selectively reflect light of a specific wavelength from the light input into an optical fiber, while transmitting light of all other wavelengths. Because the optical fiber filter is formed in the core of the optical fiber, the size of the optical fiber filter can be made to be about the same as that of the fiber. Accordingly, optical fiber filters are extremely useful and effective in making optical circuits smaller and more lightweight.

As one example of optical fiber filters, there are available devices having an optical fiber grating formed in the core of the optical fiber. The parameter of this optical fiber grating changes periodically along the longitudinal direction of the optical fiber, this periodical change including, for example, a change of the refractive index, or the core diameter.

Further, when the relationship between the period of this change ($\Lambda$) (also referred to as "grating period" below) and the wavelength of the light propagating in an optical fiber into which light has been guided satisfies the equation as follows:

$$\lambda g = 2 n_{eff} \Lambda \qquad \text{equation (1)}$$

then such optical fiber filters characteristically exhibit strong reflection of the input light. This characteristic may be understood, for example, from the graphs in FIG. 11, graph (a) showing the relationship between wavelength and transmission and graph (b) showing the relationship between wavelength and reflectivity in the case of a single mode optical fiber filter employing a single mode optical fiber. $\lambda g$, which can be obtained from equation (1), is the center wavelength of the reflected wavelengths, and $n_{eff}$ is the effective refractive index of the light which propagates through the optical fiber.

As can be obtained from the following equation (2), $$n_{eff} = \beta \cdot \lambda / 2 \pi \qquad \text{equation (2)}$$

where $\lambda$: wavelength of the propagated light $\beta$: propagation constant the effective refractive index $n_{eff}$ differs depending upon the mode of the light propagating through the optical fiber. Thus, in a multimode optical fiber filter which employs a multimode optical fiber capable of propagating multiple modes, there are a plurality of center wavelengths for the reflected wavelengths corresponding to the various modes. As a result, it is not possible to obtain extremely sharp reflection characteristics such as shown in the graphs in FIG. 11.

In contrast, in a single mode optical fiber filter which uses a single mode optical fiber capable of propagating only a single mode, there is only a single reflected wavelength. As shown in FIG. 11, the area of reflected wavelengths is extremely narrow and demonstrates very sharp reflection characteristics.

Such single mode optical fiber filters which have this kind of sharp reflected wavelength selectivity are used in monitoring systems for optical fiber telecommunications networks, mirrors composing optical fiber lasers, and optical circuits which remove or add a specific wavelength from a plurality of different wavelength signals propagating through an optical fiber.

Additionally, in the case of silica glass having added germanium that forms the core of an optical fiber, the refractive index increases upon exposure to irradiation with a ultraviolet laser.

Accordingly, when an interference pattern formed by the UV laser irradiate on the surface of the optical fiber, areas of strong UV laser irradiation and areas of weak UV laser irradiation are formed periodically intersecting with one another. Further, the refractive index of the area of strong UV laser irradiation increases, forming periodical changes in the refractive index. In this way, then, an optical fiber grating is formed.

An interference exposure method and a phase mask method are known methods employed to produce an optical fiber grating made by utilizing the above-described characteristics.

As shown in FIG. 12, in the interference exposure method, an interference pattern is formed by overlapping light from a UV laser which has been split into two optical paths, and irradiating the interference pattern on the surface of optical fiber 6, to form an optical fiber grating 8.

As shown in FIG. 13, in the phase mask method, a phase mask 10, in which a plurality of slits have been formed at fixed intervals on a silica glass plate, is brought to face an optical fiber 6. An optical fiber grating 8 is then formed by forming an interference pattern by irradiating UV laser light through phase mask 10, and exposing the interference pattern.

The grating period ($\Lambda$) here is obtained from the following equation (3) in the case of the interference exposure method, and from the following equation (4) in the case of the phase mask method.

$$\Lambda = \lambda / (2 \sin(\theta/2)) \qquad \text{equation (3)}$$

$$\Lambda = \Lambda mask / 2 \qquad \text{equation (4)}$$

Where $\lambda$: wavelength of the UV laser light $\theta$: angle formed by the two optical paths at the surface of optical fiber 6 irradiated with UV laser light $\Lambda mask$: period of the slits on the phase mask 10

The quality of optical filters, incidentally, is evaluated based on the reflectivity and the width of the reflection band.

The reflectivity (R) and the reflection band width ($\Delta \lambda$) are obtained from the following equations.

$$R = \tan h^2 (\pi \cdot L \cdot \Delta n / \lambda B) \qquad \text{equation (5)}$$

$$\Delta \lambda = \lambda B^2 / (\pi \cdot n_{eff} L) \cdot (\pi^2 + ((\pi \cdot \Delta n \cdot L)/\lambda B)^2)^{1/2} \qquad \text{equation (6)}$$

Where, L: the length of the optical fiber grating; $\Delta n$: the amount of change in the refractive index of the optical fiber grating due to UV laser irradiation; and $\lambda B$: the center wavelength of the reflected wavelengths.

In the case of optical fiber filters, it is desirable that the reflectivity be large and the reflection band width be narrow. In the case of achieving a narrow reflection band width, as explained above, this can be resolved by using a single mode optical fiber filter.

As is clear from equation 5 above, in order to obtain a high reflectivity, it is effective to make length L and the amount of change $\Delta n$ in the refractive index large when forming the optical fiber grating.

However, the length L of the optical fiber grating is generally in the range of a few millimeters to a few centimeters, so that increasing the length beyond this range is technically difficult.

On the other hand, the change $\Delta n$ in the refractive index will become larger as the amount of UV irradiation becomes greater and the concentration of germanium included in the core becomes higher. However, while $\Delta n$ becomes larger as the amount of irradiation (irradiation intensity×time) becomes greater, saturation occurs once $\Delta n$ reaches a certain level. This saturation value increases as the germanium concentration becomes higher.

Other methods for increasing the amount of change $\Delta n$ in the refractive index include a doping method in which the optical fiber filter core is doped with boron, tin, aluminum, or a rare-earth dopant, along with the germanium.

In order to make the amount of change $\Delta n$ in the refractive index due to UV laser irradiation large, a method is available in which a UV laser is used to irradiate an optical fiber in which the hydrogen therein has been diffused in advance under a high pressure hydrogen gas environment.

For example, when an optical fiber is irradiated with a UV laser without carrying out this hydrogen diffusion pretreatment, the amount of change $\Delta n$ in the refractive index is about $10^{-5}$ in the case a 1.3 μm-zero-dispersion single mode optical fiber. However, when the above method of first diffusing the hydrogen in the optical fiber under a high pressure hydrogen gas environment and then carrying out UV laser irradiation is employed, the amount of change $\Delta n$ in the refractive index increases to $10^{-3}$ for the above-described 1.3 μm-zero-dispersion single mode optical fiber. Accordingly, it is possible to obtain an optical fiber filter having a reflectivity R of 99% or more.

However, the thus produced optical fiber filter is problematic in that, among the reflected wavelengths, the transmission loss increases in the region of wavelengths shorter than the center wavelength, as is shown in FIG. 14.

In other words, in FIG. 14, in the region of wavelengths longer than the center wavelength, the transmission loss is about 0, but in the region of wavelengths shorter than the center wavelength, an increase in transmission loss of 5 dB or more was observed. Ordinarily, since it is desirable that there be no transmission loss at wavelengths other than the center wavelength, this phenomenon has presented a considerable problem in the employment of optical fiber filters.

This phenomenon occurs when the mode of the propagating light in the radial direction of the optical fiber (hereinafter, referred to as "mode field") spreads beyond the region in which the refractive index is periodically changing. Further, this phenomenon is the cause of the increase in transmission loss in the region of light having wavelengths shorter than the wavelength corresponding to the periodical change in the refractive index (i.e., the center wavelength of reflected wavelengths as described above), this transmission loss being caused by the scattering of light due to the periodical changes in the refractive index (more accurately, a portion of the light of the propagation mode couples to the cladding mode, and radiates from the core). (See Reference Document 1).

FIG. 15 shows the relationship between the refractive index distribution in the radial direction, the mold field of the LP01 mode which is the only propagation mode (fundamental mode) of a single mode optical fiber, and the amount of change in the refractive index of an optical fiber grating, for the case where the optical fiber grating is formed in a single mode optical fiber. The horizontal axis corresponds to the radial direction of the optical fiber. From the graphs in FIG. 15, it may be understood that, in the case where the optical fiber grating is formed in a single mode optical fiber, the mode field of the propagation mode extends to the outside of the core, while, in contrast, the refractive index varies periodically only in the core region. As a result, an increase in the transmission loss occurs in the area of wavelengths shorter than the center wavelength of the reflected light, as described above.

The amount of the light scattering increases together with the amount of change in the refractive index (see Reference Document 1). Thus, transmission loss in the area of shorter wavelengths increases as optical fiber filters having larger refractive index change, i.e., optical fiber filters of higher reflectivity as determined by Equation 5, are employed. Thus, this is a serious problem for high quality optical fiber filters, in particular.

SUMMARY OF THE INVENTION

Accordingly, the present invention was conceived in consideration of the above-described circumstances, and has as its objective the provision of an optical fiber filter in which the wavelength characteristics of reflection and transmission are sharp, and in which there is no increase in transmission loss at wavelengths other than the center wavelength of the reflected wavelengths.

The present invention employs a structure for an optical fiber as follows, in order to resolve the above described problems.

Namely, the optical fiber filter of a first aspect of the present invention is provided with a portion which selectively reflects or transmits light of a specific wavelength. This portion for selectively reflecting or transmitting light of a specific wavelength is comprised of a multimode optical fiber in which the refractive index of the core changes periodically along the longitudinal direction thereof, the multimode optical fiber having an input end and an output end. Furthermore, a single mode optical fiber is connected to the input end or to both the input and output ends of the multimode optical fiber.

The optical fiber filter of a second aspect of the present invention is provided with a portion for selectively reflecting or transmitting light of a specific wavelength. This portion for selectively reflecting or transmitting light of a specific wavelength is comprised of a multimode optical fiber in which the refractive index of the core changes periodically along the longitudinal direction thereof, the multimode optical fiber having an input end and an output end. The input end of the multimode optical fiber is connected to an external single mode optical fiber or an external single mode optical waveguide, or alternatively, both the input and output ends of the multimode optical fiber are connected to either an external single mode optical fiber or an external single mode optical waveguide.

The optical fiber filter of a third aspect of the present invention is characterized in that, in the optical fiber filter according to the first aspect of the present invention, the mode field diameter of the LP01 mode in the multimode optical fiber, and the mode field diameter of the single mode optical fiber, approach each other in size at least the vicinity of the connection between the multimode optical fiber and the single mode optical fiber.

The optical fiber filter of a forth aspect of the present invention is characterized in that, in the optical fiber filter according to the second aspect of the present invention, the mode field diameter of the LP01 mode in the multimode optical fiber, and the mode field diameter of the external single mode optical fiber or the external single mode optical waveguide, approach each other in size at least the vicinity of the connection between the multimode optical fiber and the external single mode optical fiber or external single mode optical waveguide.

The optical fiber filter of a fifth aspect of the present invention is characterized in that, in the optical fiber filter according to the third aspect of the present invention, the connection loss between the multimode optical fiber and the single mode optical fiber is 1 dB or less at the operation wavelengths in the optical fiber filter.

The optical fiber filter of a sixth aspect of the present invention is characterized in that, in the optical fiber filter according to the fourth aspect of the present invention, the connection loss between the multimode optical fiber and the external single mode optical fiber or external single mode optical waveguide is 1 dB or less at the operation wavelengths in the optical fiber filter.

The optical fiber filter of a seventh aspect of the present invention is characterized in that, in the optical fiber filter according to the third aspect of the present invention, the diameter of the core of the single mode optical fiber at the area of connection between the multimode optical fiber and the single mode optical fiber is enlarged.

The optical fiber filter of an eighth aspect of the present invention is characterized in that, in the optical fiber filter according to the fourth aspect of the present invention, the diameter of the core of the single mode optical fiber or the core of the single mode optical waveguide is enlarged at the area of connection between multimode optical fiber and the single mode optical fiber or the single mode optical waveguide.

The optical fiber filter of a ninth aspect of the present invention is characterized in that, in the optical fiber filter according to the third aspect of the present invention, the diameter of the core in the multimode optical fiber and the diameter of the core of the single mode optical fiber are both enlarged at the area of connection between the multimode optical fiber and the single mode optical fiber.

The optical fiber filter of a tenth aspect of the present invention is characterized in that, in the optical fiber filter according to the fourth aspect of the present invention, the diameter of the core in the multimode optical fiber and the diameter of the core of the external single mode optical fiber or the external single mode optical waveguide are both enlarged at the area of connection between the multimode optical fiber and the external single mode optical fiber or the external single mode optical waveguide.

The optical fiber filter of an eleventh aspect of the present invention is characterized in that, in the optical fiber filter according to the first aspect of the present invention, the ratio of the mode field diameter of light propagating in the LP01 mode in the multimode optical fiber to the mode field diameter of the single mode optical fiber is in the range of 1.0 to 1.5.

The optical fiber filter of a twelfth aspect of the present invention is characterized in that, in the optical fiber filter according to the second aspect of the present invention, the ratio of the mode field diameter of light propagating in the LP01 mode in the multimode optical fiber to the mode field diameter of the external single mode optical fiber or the external single mode optical waveguide is in the range of 1.0 to 1.5.

The optical fiber filter of a thirteenth aspect of the present invention is characterized in that, in the optical fiber filter according to the first aspect of the present invention, germanium is doped to the core of the multimode optical fiber, and periodical light is irradiated along the longitudinal direction thereof to form periodical changes in the refractive index of the core along the longitudinal direction of the multimode optical fiber.

The optical fiber filter of a fourteenth aspect of the present invention is characterized in that, in the optical fiber filter according to the second aspect of the present invention, germanium is doped to the core of the multimode optical fiber, and periodical light is irradiated along the longitudinal direction thereof to form periodical changes in the refractive index of the core along the longitudinal direction of the multimode optical fiber.

The optical fiber filter of a fifteenth aspect of the present invention is characterized in that, in the optical fiber filter according to the first aspect of the present invention, the multimode optical fiber is a graded index optical fiber.

The optical fiber filter of a sixteenth aspect of the present invention is characterized in that, in the optical fiber filter according to the second aspect of the present invention, the multimode optical fiber is a graded index optical fiber.

The optical fiber filter of a seventeenth aspect of the present invention is characterized in that, in the optical fiber filter according to the first aspect of the present invention, the multimode optical fiber and the single mode optical fiber are fusion spliced.

The optical fiber filter of a eighteenth aspect of the present invention is characterized in that, in the optical fiber filter according to the second aspect of the present invention, the multimode optical fiber and the external single mode optical fiber or the external single mode optical waveguide are fusion spliced.

The optical fiber filter of a nineteenth aspect of the present invention is characterized in that, in the optical fiber filter according to the first aspect of the present invention, the multimode optical fiber is housed in a plug housing of an optical fiber connector.

The optical fiber filter of a twentieth aspect of the present invention is characterized in that, in the optical fiber filter according to the second aspect of the present invention, the multimode optical fiber is housed in a plug housing of an optical fiber connector.

The optical fiber filter of an twenty-first aspect of the present invention is characterized in that, in the optical fiber filter according to the first aspect of the present invention, the multimode optical fiber is housed inside an adaptor housing of an optical fiber connector.

The optical fiber filter of an twenty-second aspect of the present invention is characterized in that, in the optical fiber filter according to the second aspect of the present invention, the multimode optical fiber is housed inside an adaptor housing of an optical fiber connector.

The following effects may be obtained from the optical fiber filter of the present invention.

Namely, because the optical fiber grating is composed by forming periodical changes in the refractive index of the core along the longitudinal direction thereof, a compact optical fiber filter is easily produced.

Further, because the input end, or the input and output ends, of the optical fiber grating are connected to the single mode optical fiber, almost all of the light propagating through the optical fiber grating is rendered into the LP01 mode, even in the case where the optical fiber grating is formed in a multimode optical fiber. Thus, it is possible to form an optical fiber filter having the same high reflectivity and narrow wavelength band as conventional optical fiber filters in which the optical fiber grating is formed in a single mode optical fiber.

Further, since the optical fiber grating is formed in a multimode optical fiber, the mode field of the LP01 mode can be almost entirely limited within the core. Thus, it is possible to control the increase in transmission loss at wavelengths shorter than the center wavelength of the reflected light, which could not be avoided in conventional optical fiber filters in which the optical fiber grating is formed in a single mode optical fiber.

Further, since the mode field diameter of the single mode optical fiber and the mode field diameter of the light in the LP01 mode propagating in the multimode optical fiber are made to be about the same size at the area of connection between the single mode optical fiber and the multimode optical fiber which includes the optical fiber grating, the connection between the multimode optical fiber and the single mode optical fiber can be realized with a low connection loss.

In this case, it is preferable that the connection loss at the area of connection be 1.0 dB or less.

Further, since the input end, or the input and output ends, of the optical fiber grating is/are connected to an external single mode optical fiber or an external single mode optical waveguide, almost all of the light propagating through the optical fiber grating is rendered into the LP01 mode, even in the case where the optical fiber grating is formed in a multimode optical fiber. Thus, it is possible to form an optical fiber filter having the same high reflectivity and narrow wavelength band as conventional optical fiber filters in which the optical fiber grating is formed in a single mode optical fiber.

Moreover, because the optical fiber grating is formed in a multimode optical fiber, it is possible to control the increase in the transmission loss at wavelengths shorter than the center wavelength of the reflected wavelengths.

Furthermore, in the present invention, the mode field diameter of the light in the LP01 mode propagating through the multimode optical fiber is formed to be almost equivalent to the mode field diameter of an external single mode optical fiber or an external single mode optical waveguide in at least the vicinity of the connection between the multimode optical fiber and the external single mode optical fiber or external single mode optical waveguide. As a result, the multimode optical fiber and an external single mode optical fiber or external single mode optical waveguide can be connected directly with low connection loss.

In this case, it is preferable that the connection loss at the area of connection between the multimode optical fiber and the external single mode optical fiber or the external single mode optical waveguide be 1.0 dB or less.

Since this type of low connection loss connection can be realized, an optical fiber for use in connecting to an external device, etc. becomes unnecessary, making is possible to greatly reduce the size of the optical fiber filter.

As a result, a connection with low connection loss can be realized with other joining methods in addition to fusion, these including butt joint connection, adhesive connection, and the like. In addition, it is also possible to form an easily releasable optical fiber filter by attaching the optical fiber inside the plug or adaptor of an optical fiber connector. A compound optical fiber filter may also be formed by installing the optical fiber in other optical parts such as optical switches or the like. Moreover, installation in an optical fiber connection closure or optical fiber cable in an optical telecommunications network is readily carried out.

Furthermore, by employing a multimode optical fiber in which germanium has been added to the core, and irradiating this multimode optical fiber with periodical light in the longitudinal direction thereof, it is possible to form periodical changes in the refractive index of the core in the longitudinal direction thereof. Thus, it is possible to easily and economically form an optical fiber filter which has a high reflectivity and a narrow reflected wavelength band. Additionally, by providing periodical change in the refractive index in the longitudinal direction of the optical fiber, characteristics of the optical fiber filter, such as the center wavelength of the reflected wavelengths, can be readily controlled.

BRIEF DESCRIPTION OF THE DRAWINGS

FIGS. 2A through 2C are cross-sectional views which show an example of the manufacturing method for this optical fiber filter.

FIGS. 3A and 3B are cross-sectional views which sequentially show an example of the manufacturing method for this optical fiber filter.

DESCRIPTION OF THE PREFERRED EMBODIMENTS

In the optical fiber filter of the present invention, an optical fiber grating is composed of a multimode optical fiber, with at least the input end of the multimode optical fiber connected to a single mode optical fiber.

Of the light propagating through the multimode optical fiber, the mode field of the LP01 mode, the lowest order mode, is limited almost entirely within the core region. Thus, no mode field extends beyond the core region.

Figure 6A:
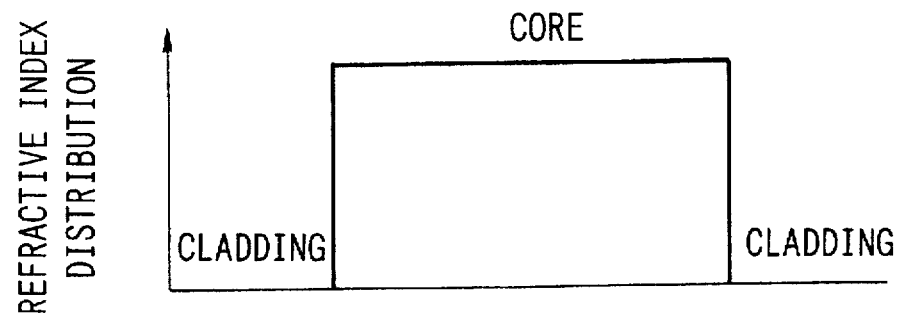
FIGS. 6a)–c) depicts graphs showing the relationship between the refractive index distribution of a multimode optical fiber provided with an optical fiber grating, the optical power distribution of the light propagated through the multimode optical fiber, and the amount of change in the refractive index which has increased due to the formation of an optical fiber grating by irradiating the multimode optical fiber with light from a UV laser.
Figure 6B:
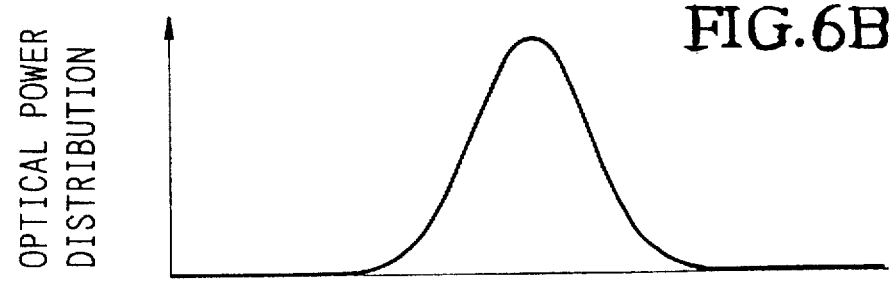
Figure 6C:
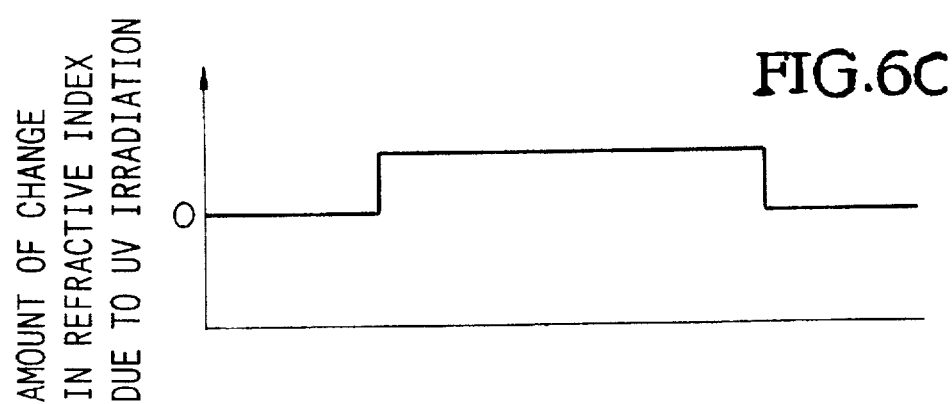

FIG. 6 shows the relationship between the refractive index distribution of a multimode optical fiber provided with an optical fiber grating, the optical power distribution of the light propagating through the multimode optical fiber, and the amount of change in the refractive index which has increased due to the formation of an optical fiber grating by irradiating the multimode optical fiber with light from a UV laser. The horizontal axis corresponds to the radical direction of the multimode optical fiber.

As may be understood from FIGS. 6a)–c), when the optical fiber grating is formed in a multimode optical fiber, the region in which the refractive index changes periodically is larger than the mode field of the LP01 mode. Accordingly, it is possible to control the increase in transmission loss at shorter wavelengths for light propagating in the LP01 mode.

In contrast, when the optical fiber grating is formed in a multimode optical fiber, a plurality of center wavelengths from among various reflected wavelengths are present corresponding to the multiple modes which can be propagated. As a result, it is not possible to obtain the same high reflectivity and narrow reflection band provided in the conventional single mode optical fiber filter which has only a single reflection wavelength. However, if the propagation mode can be limited to just a single mode by some means, then it is possible to obtain the above described reflection characteristics.

If at least the input end of a multimode optical fiber is connected to a single mode optical fiber, then the LP01 mode, which is the fundamental mode of a single mode optical fiber, can be launched into the multimode optical fiber, exciting the LP01 mode which is almost all the low order modes. As a result, when at least the input end of a multimode optical fiber is connected to a single mode optical fiber in the case where an optical fiber grating is formed in a multimode optical fiber, almost all the light which is reflected or transmitted by the optical fiber grating is in the LP01 mode, the lowest order mode. Accordingly, it becomes possible to obtain a high quality optical fiber filter having the same high reflectivity and narrow reflection band as provided by conventional single mode optical fiber filters that have only a single reflected wavelength. Moreover, this high quality optical fiber filter is also able to control the increase in transmission loss at shorter wavelengths, this having been unavoidable in conventional single mode optical fiber filters.

Further, in order to improve the above characteristics, in the multimode optical fiber in the present invention, it is desirable that:

(i) the mode field of the LP01 mode, the lowest order propagation mode, be even further concentrated inside the core region (ii) as much as possible, the mode field of the LP01 mode (i.e., the lowest order propagation mode) in the multimode optical fiber, be the same size as the mode field of the LP01 mode in the single mode optical fiber (i.e., the single mode optical fiber's fundamental mode) which is connected to the input end of the multimode optical fiber (iii) the number of modes which can propagate through the multimode optical fiber be made as small as possible Condition (i) above is necessary in order to control the increase in transmission loss at shorter wavelengths, and may be accomplished by making the normalized frequency V obtained from the following equation large.

$$V = (2\pi a/\lambda)(2\Delta)^{1/2} \qquad \text{equation (7)}$$

Where, a: core diameter; n: refractive index of the cladding; and $\Delta$: relative refractive index difference between the core and the cladding. V>2.41 is the parameter for a multimode optical fiber.

Condition (ii) above is necessary in order to obtain a larger reflectivity and a narrower reflection band by, as much as possible, exciting only the lowest order propagation mode LP01 while not exciting the higher order propagation modes, so that almost all the light reflected or transmitted by the multimode optical fiber grating is in the LP01 mode only. In this case, it is necessary to reduce as much as possible the mode field of the lowest order propagation mode LP01, which can be done, however, by making the normalized frequency V, and in particular, the core diameter, small.

Further, condition (ii) above is necessary for reducing the connection loss when connecting a single mode optical fiber and a multimode optical fiber together. Since this connection loss is additional to the excess loss of the optical fiber filter, (ii) is also the condition necessary for reducing the excess loss of the optical fiber filter. Moreover, (ii) is also the condition necessary to control the connection loss at the output end when a single mode optical fiber is connected to the output end of a multimode optical fiber grating in order to connect the optical fiber filter to an external optical circuit or optical telecommunications network. Accordingly, (ii) is the desired condition for reducing the connection loss to obtain a higher quality optical fiber filter.

Condition (ii) above can also be realized by expanding the size of the mode field of the LP01 mode (fundamental mode) in the single mode optical fiber around the area of connection to the multimode optical fiber grating, so that the single mode optical fiber's mode field is, as much as possible, the same size as the mode field of the LP01 mode (i.e., lowest order mode) in the multimode optical fiber grating.

Condition (iii) above is necessary in order to obtain a larger reflectivity and narrower reflection band by reducing mode coupling and making it difficult for coupling from the excited lowest order LP01 mode to a high order propagation mode to occur, so that almost all the light reflected or transmitted by the multimode optical fiber grating is in the lowest order mode LP01 only. This can be accomplished by making the normalized frequency V small.

Accordingly, conditions (i), (ii) and (iii) as set forth above are mutually contradictory with respect to the value of the normalized frequency V, etc. Moreover, there are various type of multimode optical fibers, including, for example, graded index optical fibers (GI optical fiber) and step index optical fibers (SI optical fiber), such that the conditions (i), (ii) and (iii) will change depending on the type of multimode optical fiber employed. Thus, in order to realize an even higher quality optical fiber filter, these points must be taken into consideration in the design.

A more concrete explanation follows below.

(1) In the present invention, the mode field of the single mode optical fiber and the mode field of the multimode optical fiber are made to be as equivalent as possible with respect to size and shape of the mode fields. In an optical fiber in which the core has an ordinary refractive index distribution, the shape of the mode field of the LP01 mode becomes approximately a Gaussian distribution irrespective of the type of optical fiber employed. Accordingly, in an optical fiber in which the core has an ordinary refractive index distribution, the above noted condition (ii) will be satisfied if, as much as possible, the sizes (i.e., mode field diameter) of the mode fields of both LP01 modes are equal.

(2) In the case of a GI optical fiber, even if the normalized frequency V is not very large, the mode field of the lowest order LP01 mode is almost entirely concentrated around the center of the core. Accordingly, when using a GI optical fiber FOR an optical fiber grating, the conditions set forth in (i) above are almost always satisfied, so that it is possible to satisfy the conditions set forth in (ii) and (iii) above by making the core diameter and the normalized frequency V small. As a result, it is relatively easy to realize a higher quality optical fiber filter.

(3) In the case of an SI optical fiber, more than 99% of the optical power of the mode field of the lowest order mode LP01 is confined in the core. It is known that the relationship between the core diameter a and the mode field diameter MFD of the LP01 mode theoretically converges as follows:

$$MFD/2a \rightarrow 0.65 \qquad \text{equation (8)}$$

Accordingly, where employing an SI optical fiber for an optical fiber grating, in order to satisfy condition (ii) above when connecting a SI optical fiber to a single mode optical fiber with a mode field diameter of 10 µm, it is satisfactory to use an SI optical fiber having a core diameter of around 15 µm. Then, in order to satisfy condition (i) above, it is necessary to set the relative refractive index difference of the SI optical fiber to a high value, and to set the normalized frequency V to be large. For example, desirable results should be obtained when the relative refractive index is set to 1.5% or higher.

(4) In another method for satisfying condition (i) above, the mode field of the single mode optical fiber is partially enlarged around the area of connection between the single mode optical fiber and the multimode optical fiber of the optical fiber grating, so that the mode field of the single mode optical fiber approaches the size and shape of the mode field of the LP01 mode of the multimode optical fiber. In one technique in wide use today for this method, a dopant included in the core of the single mode optical fiber is diffused. More specifically, by heating at a temperature of 1800° C. or higher, at which an arc discharge can be obtained, the standard dopant, germanium, is diffused over a relatively short heating time of, for example, 10 to 100 secs. As a result of this operation, the core of the single mode optical fiber expands, thereby expanding the mode field. As a partial heating method, arc discharge, oxyhydrogen flame, or the like are available. These methods can be carried out during the connection process, or as a step prior thereto.

When the mode field of a single mode optical fiber is partially expanded, a portion of the light is radiated outside the core, causing transmission loss to increase. As a result, the addition loss in the optical fiber filter is believed to increase. This increase in loss is dependent on the mode field diameter after expansion and on the length of the expanded portion. Thus, it is necessary to lengthen the expanded portion to a length such that the loss increase can be ignored. For example, when the mode field diameter after expansion is doubled, the increase in loss can be ignored if the length of the expanded portion is in the range of 400λ to 500λ (where λ is the wavelength of the light).

Using this method, an optical fiber filter may be considered wherein a multimode optical fiber having a large standard core is used for the optical fiber grating. In particular, in the case of a standard GI optical fiber, the mode field of the lowest order mode LP01 is concentrated around the center of the core, and the difference between this mode field and the mode field of the single mode optical fiber is not very large. Thus, it is relatively easy to realize an optical fiber filter of this construction.

Further, the method of enlarging the mode field of the single mode optical fiber around the area of connection may be combined with the methods described in (2) or (3) above.

(5) In the optical fiber filter according to the present invention, at least the input end of the multimode optical fiber in the optical fiber grating must be attached to a single mode optical fiber. In the embodiments of the present invention, an easy-to-use optical fiber filter device is formed by forming an optical fiber filter in which a single mode optical fiber is connected by fusion or the like in a unitary manner to a multimode optical fiber, and storing this optical fiber filter in a suitable housing. In this case, it is desirable to employ the constructions set forth in (1) through (4) above in order to improve the characteristics of the optical fiber filter.

(6) As another embodiment of the present invention distinct from (5) above, an optical fiber filter can be formed by combining a single mode optical fiber for an external optical circuit, optical telecommunications network, or the like, and a multimode optical fiber for an optical fiber grating. In this case, the structure of the multimode optical fiber is optimally designed so as to correspond to the mode field of the external single mode optical fiber, such that it has a structure as set forth in (2) or (3) above. Then, by connecting the light input end of the multimode optical fiber to an external single mode optical fiber, it is possible to realize an optical fiber filter having the same high capabilities as that of the optical fiber filter obtained in (5) above. Further, if the mode field of the multimode optical fiber is made to correspond to the mode field of the single mode optical fiber, then a low-loss connection with the external single mode optical fiber can be realized by means of fusion splice, butt joint connection, adhesive connection, a connector, or other type of connection. As a result, it is also possible to employ a construction in which the multimode optical fiber grating is mounted inside an optical component, and connected to an external single mode optical fiber using a connector or the like. Accordingly, an optical fiber filter having the same high capabilities as that of the optical fiber filter obtained in (5) above can be realized with this construction, as well.

A variety of optical fibers may be employed as the external single mode optical fiber, these including a 1.3 μm zero-dispersion optical fiber, a dispersion shifted optical fiber, and the like. A variety of multimode optical fiber gratings corresponding individually to these single mode optical fibers may be formed by making the mode field thereof correspond to the mode field of the external single mode optical fiber, as described above. However, in the single mode optical fibers usually used, even if the optical fiber type differs, there is not much difference between the mode fields, so that there is not a considerable deterioration in filter characteristics even in the case of a connection between a multimode optical fiber grating and a single mode optical fiber in which the mode fields do not strictly correspond to one another. Therefore, it is possible to employ only a multimode optical fiber grating which corresponds to the mode field of the standard single mode optical fiber (for example, a 1.3 μm zero dispersion fiber), while connecting another type of external single mode optical fiber.

As the external input source for the single mode light, a single mode optical waveguide may be considered. This may be realized by making a multimode optical fiber grating correspond to the mode field of the light propagating in the optical waveguide, and connecting this optical waveguide to the input end of the multimode optical fiber grating. Further, if a single mode optical waveguide to which a single mode optical fiber is connected is employed, there is not a great difference between the mode field of the fundamental mode of the single mode optical waveguide and the mode field of the single mode optical fiber. As a result, this optical waveguide may be connected to the input end of a multimode optical fiber grating which corresponds to the mode field of a standard single mode optical fiber (for example, 1.3 μm zero dispersion optical fiber). In this case, a low-loss connection with an external optical waveguide can be accomplished by means of a butt joint connection, fusion splice, use of a connector, or the like.

In the case of a multimode optical fiber grating of this construction, a low-loss connection as described above is readily accomplished, while the grating is also extremely compact. As a result, this type of grating is easily contained within an optical component, such as an optical connector. By housing this multimode optical fiber grating inside an optical coupler, optical switch or other functional optical component, it is possible to realize an advanced optical component having compound functions. Further, this multimode optical fiber grating can also be housed in a connection closure for optical cables or in an optical fiber cable in optical telecommunications networks.

A more detailed explanation will now be made of preferred embodiments of the present invention.

Figure 1A:
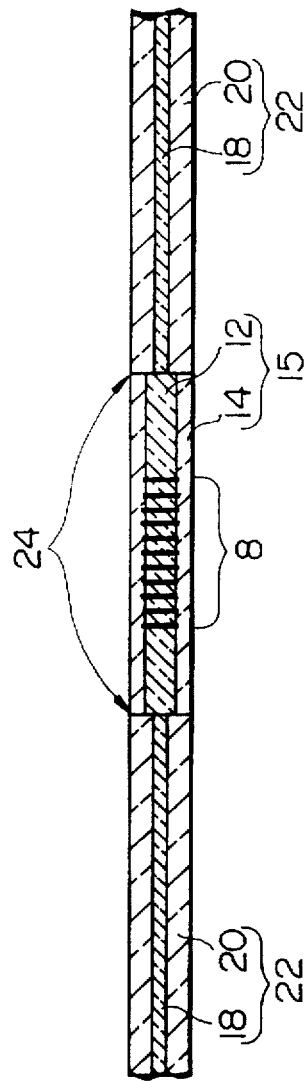
FIG. 1A is a cross-sectional view of one example of the optical fiber filter of the present invention.

FIG. 1A is a diagram in longitudinal cross-section of one example of the optical fiber filter of the present invention. Multimode optical fiber 15 is composed of a core 12 and a cladding 14. Core 12 is provided with an optical fiber grating 8 which has a periodically changing refractive index.

Light can be launched from either end of this bare multimode optical fiber 15, while bare single mode optical fibers 22,22 are fusion spliced to either end of multimode optical fiber 15 at fusion spliced points 24.

In the case where a regular 1.3 μm zero dispersion single mode optical fiber is employed for the bare single mode optical fibers 22,22, the diameter of cores 18,18 thereof is in the range of 8 to 10 μm. The mode field diameter thereof is generally in the range of 9 to 10.5 μm at a wavelength of 1.55 μm. Further, the relative refractive index difference, which is the difference between the refractive index of core 18 and cladding 20, is in the range of 0.3 to 0.4%.

The length of the bare multimode optical fiber 15 is in the range of 15 to 30 mm, while the length of the optical fiber grating 8 is in the range of 5 to 20 mm.

The diameters of the bare multimode optical fiber 15 and the bare single mode optical fibers 22,22 are typically 125 μm.

For example, when a GI optical fiber is employed as bare multimode optical fiber 15, if the relative refractive index difference is set to be around 1% and the diameter of core 12 is set to be around 25 to 30 μm, then the diameter of the mode field of the LP01 mode can be set to be in the range of 9 to 11 μm. By connecting a bare single mode optical fiber 22, having a core 18 diameter of 9.5 μm, a mode field diameter of 10.2 μm, and a relative refractive index difference of 0.35%, to the end of this GI optical fiber, the mode fields of the LP01 modes of both fibers can be made to approach one another in size and shape, to form an optical fiber filter having excellent characteristics.

In the case where an SI fiber is employed as the bare multimode optical fiber 15, if the relative refractive index is set to be around 1.5 to 1.7% and the diameter of core 12 is set to be around 15 to 17 μm, then the diameter of the mode field can be set to be in the range of 10 to 10.5 μm. By connecting a bare single mode optical fiber 22, having a core 18 diameter of 10 μm, a mode field diameter of 10.2 μm, and a relative refractive index difference of 0.4%, to the end of this SI optical fiber, the mode fields of the LP01 modes of both optical fibers can be made to approach one another in size and shape, to form an optical fiber having excellent characteristics. In this case, the connection loss of both the bare multimode optical fiber 15 and the bare single mode optical fiber 22 is 0.2 dB or less, and a device having extremely low connection loss is obtained. In the case where an SI optical fiber is employed, the normalized frequency V is made as large as possible, the SI optical fiber's relative refractive index difference is set to 1.5% or higher, and the core diameter is set to a suitable size, so that the LP01 mode is sufficiently confined in the core of the SI optical fiber.

A high silica core fiber, a dispersion shifted optical fiber, or the like, may be employed as the above described bare single mode optical fiber 22.

Figure 1B:
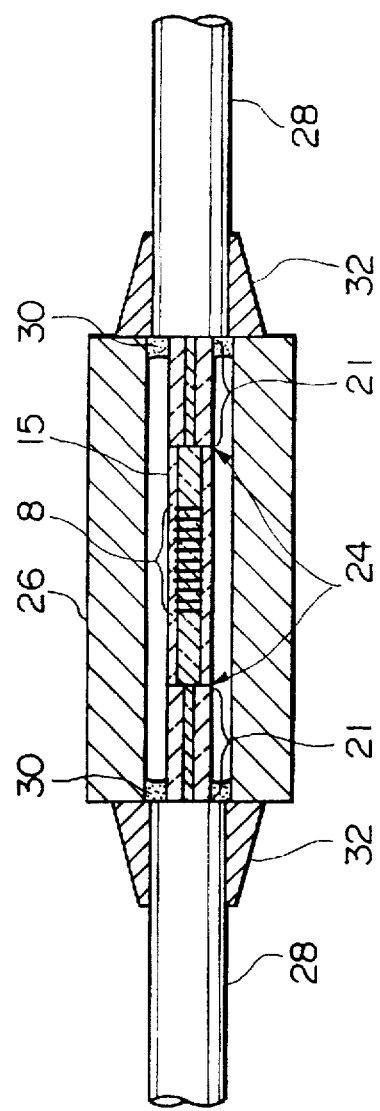
FIG. 1B is a cross-sectional view showing one example of the device in the case where the optical fiber filter shown in FIG. 1A is employed by mounting in a suitable housing.

FIG. 1B shows an example of a device in which the above described optical fiber filter is employed after mounting in a suitable housing.

Bare multimode optical fiber 15 provided with an optical fiber grating 8 and is fusion spliced at fusion spliced points 24 to the ends of bare single mode optical fibers 21,21 from which the resin coating which covers the coated single mode optical fibers 28,28 has been removed.

This bare multimode optical fiber 15, and the bare single mode optical fibers 21,21 connected thereto, are housed inside a reinforcing case 26, held in place by adhesive 30.

Resin coated single mode optical fibers 28,28 are fixed in place to the ends of reinforcing case 26 by rubber boots 32,32.

In the examples of optical fiber filters shown in FIGS. 1A and 1B, the diameter of the multimode optical fiber core is set to a small value in order to make the size of the mode field diameter of the LP01 mode therein approach the size of the mode field diameter of the single mode optical fiber.

Another method for bringing the size of the mode field diameters of the multimode optical fiber and the single mode optical fiber close together in size is to make the diameter of one end of the single mode optical fiber core a bit larger. As a result, the size of the mode field of the LP01 mode of the multimode optical fiber and the size of the mode field of the LP01 mode of the single mode optical fiber are brought closer together around the area of fusion splice between the two fibers.

Figure 2A:
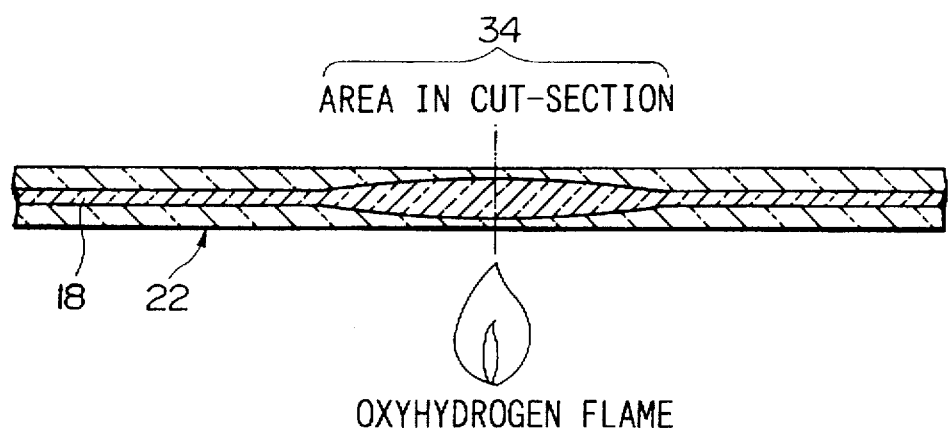
Figure 2B:
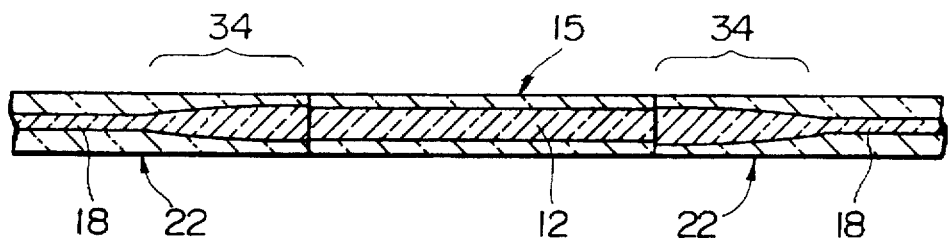
Figure 2C:
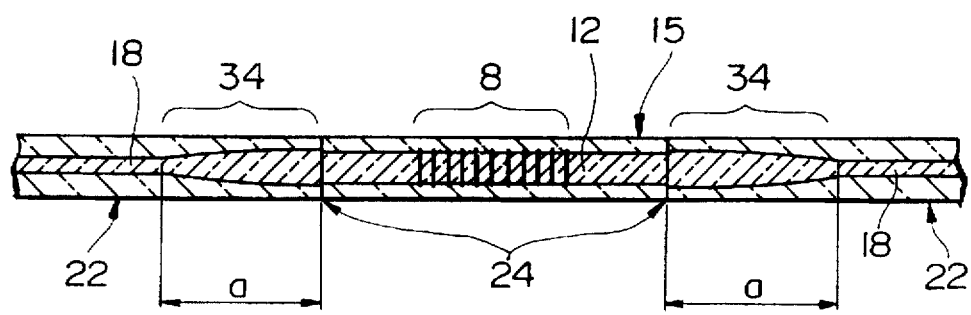
FIG. 2C is a cross-sectional view of one example of an optical fiber filter in which the core diameter of one end of a single mode optical fiber is enlarged.

FIG. 2C shows an example of a device constructed by means of the above method, the figure being a view in longitudinal cross-section of an example of an optical fiber filter in which the diameter of core 18 at one end of bare single mode optical fiber 22 is enlarged.

In this optical fiber filter, a standard GI optical fiber is employed in optical fiber grating 8. Bare single mode optical fibers 22,22 are fusion spliced to each of the ends of a bare multimode optical fiber 15, the diameter of core 18 expanding in the direction of fusion spliced points 24.

In bare multimode optical fiber 15, which is a standard GI optical fiber, the diameter of core 12 is in the range of 40 to 60 μm, and the relative refractive index difference is about 1%. The mode field diameter of the LP01 mode is in the range of 15 to 20 μm.

With the exception of the enlarged portion 34 of core 18 of the bare single mode optical fiber 22, the diameter of the rest of the core is in the range of 9 to 10 μm, while the mode field diameter is in the range of 9 to 10.5 μm. By providing an enlarged portion 34 in the area of fusion spliced points 24, the maximum core diameter and maximum mode field diameter are, respectively, 13 to 18 μm, and 15 to 20 μm. Further, the length a of enlarged portion 34 is in the range of 2 to 20 mm.

In other words, the mode field diameter of bare single mode optical fiber 22 and the mode field diameter of the LP01 mode of a GI optical fiber, i-e., bare multimode optical fiber 15, approach one another in size at fusion spliced points 24, so that the ratio therebetween is in the range of 1 to 1.3.

Figure 3A:
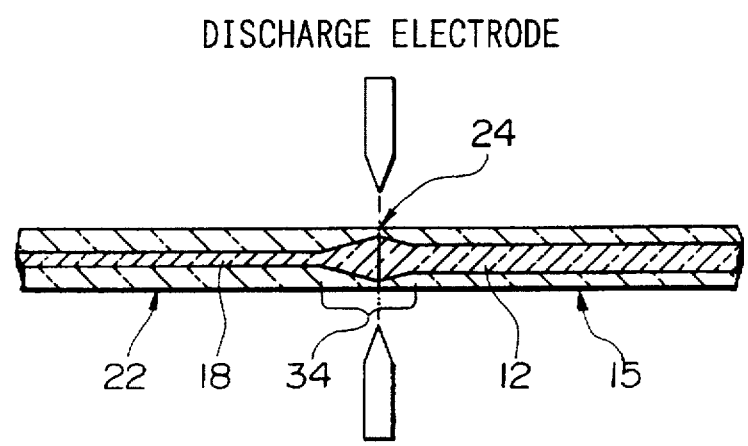
Figure 3B:
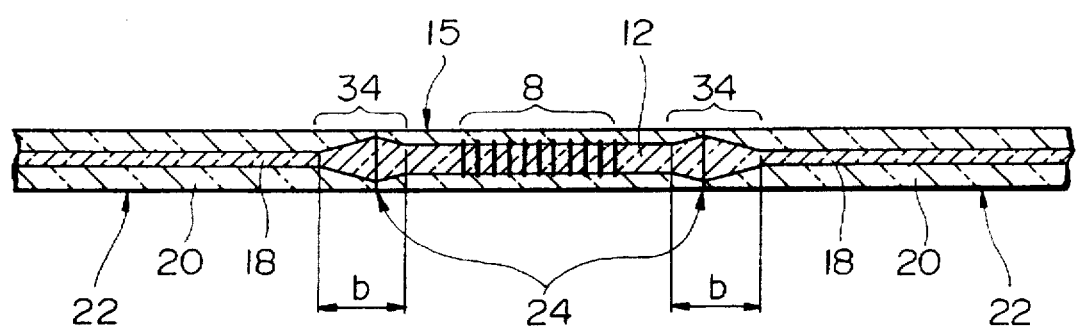
FIG. 3B is a cross-sectional view of an example of an optical fiber filter in which a portion of the core of a single mode optical fiber and a portion of the core of a multimode optical fiber have both been enlarged, with the diameters of the mode fields thereof made to be the same size.

Further, as shown in FIG. 3B, a portion of core 18 of bare single mode optical fiber 22 and a portion of core 12 of bare multimode optical fiber 15 may be enlarged in the direction of fusion spliced points 24, making it possible to obtain an optical fiber filter in which the mode fields of these portions approach one another in size.

When a GI optical fiber is employed as the bare multimode optical fiber 15, with the exception of the expanded portion 34, the diameter of core 12 is in the range of 40 to 60 μm, with the diameter of the mode field of the LP01 mode being in the range of 15 to 20 μm.

The maximum core diameter of enlarged area 34 of core 12 of this bare multimode optical fiber 15 is in the range of 50 to 70 μm, while the maximum mode field diameter of the LP01 mode is in the range of 18 to 25 μm.

Further, with the exception of expanded portion 34, core 18 of bare single mode optical fiber 22 has a diameter in the range of 9 to 10 μm, with the mode field diameter thereof in the range of 9 to 10.5 μm. As a result of expanding the core of this bare single mode optical fiber 22 at expanded portion 34, core 18 has a maximum diameter is in the range of 13 to 18 μm, with a maximum mode field diameter in the range of 15 to 20 μm.

As a result, it is possible to connect multimode optical fiber 15 and single mode optical fiber 22 at fusion spliced points 24 so that there is almost no difference in the diameter of the mode field of the LP01 mode of bare multimode optical fiber 15 and the diameter of the mode field of bare single mode optical fiber 22.

The length b of expanded portion 34 here is in the range of 2 to 20 mm.

As in the examples of the optical fibers shown in FIGS. 2C and 3B, the increase in connection loss due to the provision of an expanded portion 34 in the cores of bare multimode optical fiber 15 and bare single mode optical fiber 22 can be controlled by making the length of expanded portion 34 sufficiently long. Ordinarily, if this length is 400 to 500 times greater than the wavelength of the light employed, the connection loss can be limited to 0.1 dB or less. In other words, the longer the enlarged portion of the core, the greater the reduction in the connection loss.

FIG. 1B shows one example of a device realized by fusion splicing bare multimode optical fiber 15 and bare single mode optical fiber 22, the device capable of being mounted inside an optical fiber connector.

Figure 4:
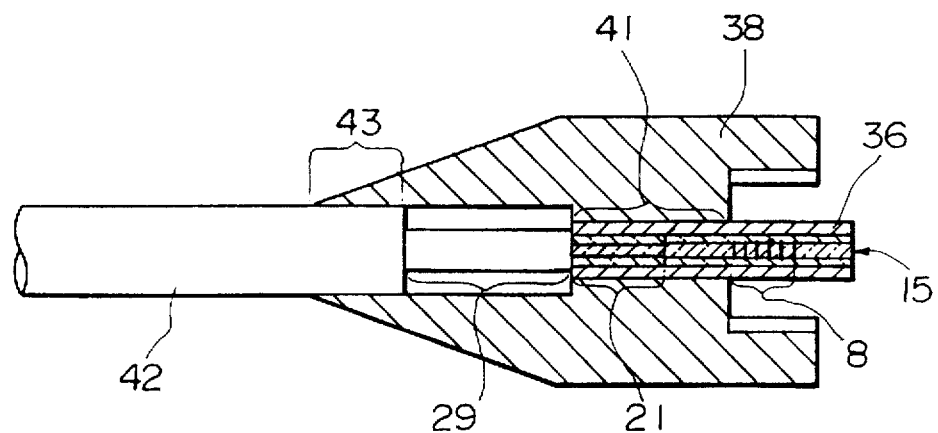
FIG. 4 is a cross-sectional view showing an example in which the optical fiber filter of the present invention is mounted in an optical fiber connector plug.

FIG. 4 shows an example in which the above described optical fiber filter is mounted inside an optical fiber connector plug.

Single mode optical fiber cord 42 is provided at one end thereof with an exposed resin covered optical fiber 29 and a bare single mode optical fiber portion 21 from which the resin coating layer has been removed from the optical fiber.

The end of bare single mode optical fiber portion 21 is cut so as to form a mirror finished surface, inserted from one end of a ferrule 36 and fixed in place. The ends of a bare multimode optical fiber 15, which has the same structure as the device shown in FIG. 1A, and is provided with an optical fiber grating 8, are cut so as to form a mirror finished surface, and bare multimode optical fiber 15 is inserted from the other end of ferrule 36. The end of bare single mode optical fiber portion 21 and the end of bare multimode optical fiber 15 are adhered together and fixed in place inside ferrule 36.

The end surface of ferrule 36 is polished, with ferrule 36, fixed portion 41 inside the housing, resin coated optical fiber 29, and fixed portion 43 inside the housing for optical fiber cord 42, housed inside plug housing 38, and fixed in place there to form the plug.

This plug is connected via an adaptor to another plug housing which houses one end of another single mode optical fiber. As a result, bare multimode optical fiber 15 which is provided with an optical fiber grating 8 is connected to the single mode optical fiber, to form an optical fiber connector.

Figure 5:
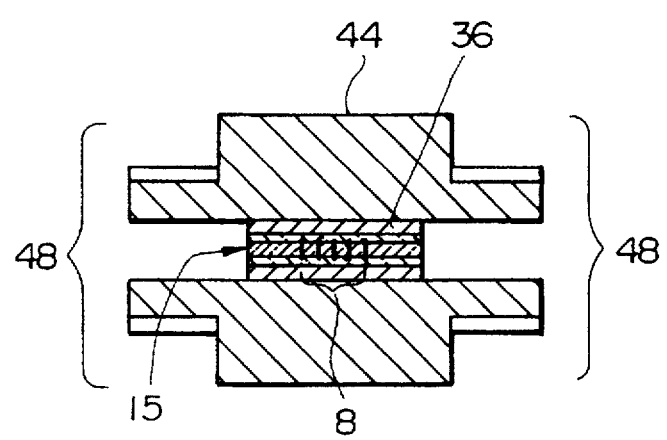
FIG. 5 is a cross-sectional view showing an adaptor used in the case where mounting the optical fiber filter of the present invention, the adaptor housing a multimode optical fiber having an optical fiber grating.

As shown in FIG. 5, a bare multimode optical fiber 15, which has the same structure as the device shown in FIG. 1A, and is provided with an optical fiber grating 8, is inserted and fixed in place inside ferrule 36. Both ends of ferrule 36 are polished, and in this state, the assembly may then be fixed inside adaptor housing 44, to form an adaptor.

By connecting, respectively, two other plugs housing the ends of single mode optical fibers to the plug connectors 48,48 of the adaptor, an optical fiber filter for an optical fiber connector can be formed.

As a result, by designing an optical fiber connector which is easily releasable, handling is made easier, and detachment can be carried out in a shorter period of time.

In the optical fiber filters shown in FIGS. 1A, 2C and 3B, bare single mode optical fibers 22,22 are connected to the ends of bare multimode optical fiber 15 which has an optical fiber grating 8. As a result, since light is launched into multimode optical fiber 15 through either one of single mode optical fibers 22,22, only the LP01 mode in the multimode optical fiber is excited in correspondence to the LP01 mode of the single mode optical fiber 22. Accordingly, even if the optical fiber grating is formed in a multimode optical fiber, it is possible to realize an optical fiber filer having the same extremely sharp reflection characteristics as those exhibited by conventional single mode optical fibers having only a single reflection wavelength characteristic.

Further, since light may be launched from either of the single mode optical fibers in this assembly, it is possible to realize an optical fiber filter which is easy to use.

Further, since the optical fiber grating is formed in a multimode optical fiber, the optical fiber filter obtained has a transmission loss of almost zero at wavelengths other than the center wavelength.

The above described optical fiber filter is designed so that the mode field diameter of the LP01 mode of the bare multimode optical fiber 15 and the mode field diameter of the bare single mode optical fiber 22 approach one another in size in at least the vicinity of fusion spliced points 24. As a result, the degree of the LP01 mode's single excitation can be improved, while the above-described single reflected wavelength characteristic can be improved still further. Moreover, the connection loss can be reduced, and the excess loss inside the optical fiber filter can be decreased.

As a result, the optical fiber filter can be directly connected to an external optical circuit or the like, without requiring an optical fiber, etc. for connection. Thus, the apparatus can be made smaller.

The optical fiber filters shown in FIGS. 2C and 3B can employ a standard GI optical fiber in a multimode optical fiber grating, thereby reducing the cost of production.

As in the case of the optical fiber filter shown in FIG. 1B, the optical fiber filters shown in FIGS. 2C and 3B may also employ a structure in which the optical fiber filter is housed in a housing (reinforcing case 26). In an optical fiber filter having a structure such as shown in FIG. 1B, the fragile bare optical fiber portion or connector is protected by the housing, thus improving the reliability of the optical fiber filter and making it extremely easy to use. Further, external devices can be easily connected to the ends of single mode optical fibers by using a fusion splice or a connector.

In an optical fiber filter having the structure shown in FIG. 4, a multimode optical fiber grating (optical fiber grating 8) is housed inside a connector plug (plug housing 38), and a connector cord is formed of a single mode optical fiber (single mode optical fiber cord 42) which is connected to multimode optical fiber grating. As a result, connection to and disconnection from an external device are easily performed. The input of single mode light to the multimode optical fiber grating is usually carried out from the connector cord side. However, depending on the circumstances, single mode light may be input from an external single mode optical fiber which is connected to a connector via an adaptor. Additionally, in place of a single mode optical fiber cord, a jacketed single mode optical fiber may also be used.

In the optical fiber filter having the structure shown in FIG. 5, a multimode optical fiber grating (optical fiber grating 8) is housed in a connector adaptor (adaptor housing 44). As a result, the input of single mode light into the multimode optical fiber grating is carried out by connecting an external single mode optical fiber having a connector plug. The output side is connected in the same way to an external device. Accordingly, as a result of this type of design, it is possible to realize an optical fiber filter which is compact and easily connects to and disconnects from the external device.

An explanation will now be made of an example of the manufacturing method for the optical fiber filter shown in FIG. 1A.

A GI or SI optical fiber of the same structure as that shown in FIG. 1A having a core 12 consisting of silica glass to which germanium has been added in the amount of 8 to 20 mol % is employed as bare multimode optical fiber 15.

First, bare single mode optical fibers 22,22 are connected to the ends of a bare multimode optical fiber 15 at fusion spliced points 24.

In order to provide a large change in the refractive index of optical fiber grating 8, this assembly is placed in an hydrogen gas environment at a pressure of 80 to 150 atmospheres, and kept undisturbed for 3 to 7 days.

Next, using the phase mask method, an optical fiber grating 8 is formed in core 12 of bare multimode optical fiber 15, thereby forming an optical fiber filter.

By controlling the period of the plurality of slits provided in the phase mask employed in the phase mask method, it is possible to vary such optical fiber filter characteristics as the center wavelength of the reflecting wavelengths.

In the manufacturing method shown in FIG. 1A, the order of the steps for connecting the single mode optical fibers 22,22 and for forming the optical fiber grating 8 in multimode optical fiber 15 may be interchanged depending on the circumstances.

Next, an explanation will be made of the manufacturing method for the optical fiber shown in FIG. 2C.

As shown in FIG. 2A, one portion of bare single mode optical fiber 22 is heated for 10 to 100 seconds at 1800° to 2000° C. with an oxyhydrogen flame, diffusing the germanium in the silica glass which forms core 18, thereby forming an expanded portion 34 in core 18.

The center of this expanded portion 34 is cut, and fusion spliced to the ends of a standard GI optical fiber as a bare multimode optical fiber 15, as shown in FIG. 2B.

In order to provide a large variation in the refractive index, this assembly is soaked undisturbed for 3 to 7 days in a hydrogen gas environment at a pressure of 80 to 150 atmospheres.

Next, as shown in FIG. 2C, an optical fiber grating 8 is formed in the core 12 of this bare multimode optical fiber 15, forming an optical fiber filter.

An explanation will now be made of an example of the manufacturing method for the optical fiber filter shown in FIG. 3B.

First, as shown in FIG. 3A, the end of bare single mode optical fiber 22 and the end of bare multimode optical fiber 15 are fusion spliced, and this fusion spliced points 24 is placed between a pair of discharge electrodes. Using an arc discharge from the pair of discharge electrodes, the vicinity of fusion spliced points 24 is heated for 5 to 60 seconds, at 1900° to 2100° C., to form expanded core portion 34.

The other end of this bare multimode optical fiber 15 is fusion spliced to the end of another bare single mode optical fiber 22 in the same manner, and an expanded portion 34 in the core is formed.

In order to provide large variation in the refractive index, this assembly is soaked for 3 to 7 days in a hydrogen gas environment at a pressure of 80 to 150 atmospheres.

Next, as shown in FIG. 3B, an optical fiber grating 8 as formed above is formed to core 12 of bare multimode optical fiber 15, to form an optical fiber filter.

When forming expanded portion 34 in this case, the diameter of core 18 of the above-described bare single mode optical fiber 22 is smaller than the diameter of core 12 of bare multimode optical fiber 15. Accordingly, it is necessary to increase the diffusion speed of the germanium in core 18 of bare single mode optical fiber 22 in order to bring the mode field diameters of single mode optical fiber 22 and multimode optical fiber 15 closer together in size to one another when they are simultaneously heated to diffuse the germanium which is included in the silica glass which forms the cores thereof.

For this purpose, it is preferable to employ a bare single mode optical fiber 22 having a cladding 20 of a single mode optical fiber formed using silica glass which includes an additive such as fluorine and chlorine to promote the diffusion of germanium, the additive included in the amount of 0.1 to 0.4% change of the relative refractive index difference.

Reference Document 1

Victor Mizrahi and J. E. Sipe, "Optical Properties of Photosensitive Fiber Phase Gratings", Journal of Lightwave Technology, Vol. 11, No. 10, pp. 1,513–1,517 (1993).

EXAMPLES

Examples of the present invention will now be explained in greater detail.

The single mode optical fiber employed in Examples 1 through 3 has a core diameter of 10 μm, a mode field diameter of 9.5 μm, a relative refractive index difference of 0.35%, and a zero dispersion wavelength of 1.3 μm. The core is formed of silica glass to which 3.5 mol % of germanium has been doped.

The single mode optical fiber employed in Example 4 differs from the above-described single mode optical fiber in that fluorine in the amount of 0.4% change of the relative refractive index change has been added to the silica glass forming the cladding.

The multimode optical fiber employed in Examples 1, 3, and 4 is a standard GI optical fiber having a core diameter of 50 μm and a relative refractive index difference of 1%. The mode field diameter of the LP01 mode is 15 μm.

The multimode optical fiber employed in Example 2 is a standard SI optical fiber having a core diameter of 15 μm and a relative refractive index difference of 1.3%. The mode field diameter of the LP01 mode is 10 μm.

The diameters of the multimode optical fiber and the single mode optical fiber explained above are 125 μm.

In Examples 1 through 4, the single mode optical fiber and the multimode optical fiber were fusion spliced and, if necessary, a portion of the cores thereof were enlarged. Then, the assembly was soaked for one week in a hydrogen gas environment at a pressure of 100 atmospheres, after which, the optical fiber grating was formed.

(Example 1)

An optical fiber filter having the structure shown in FIG. 1 was produced by the above-described method.

A standard GI optical fiber of 20 mm in length was employed as bare multimode optical fiber 15. An optical fiber grating 8 having a length of 10 mm was formed in bare multimode optical fiber 15.

The ratio between the mode field diameter of the LP01 mode of bare single mode optical fiber 22 and the mode field diameter of the LP01 mode of bare multimode optical fiber 15 was 1.5.

The connection loss at fusion spliced points 24 of this optical fiber filter was 1.3 dB.

Figure 7:
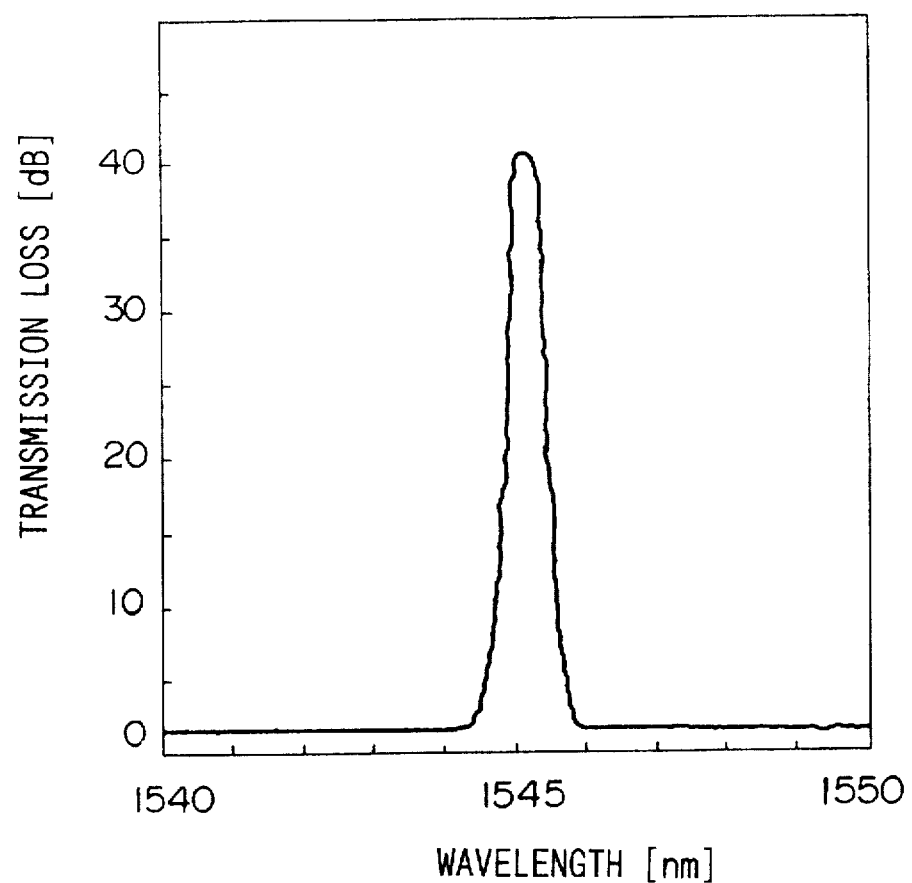
FIG. 7 is a graph showing the results when the transmission loss of the optical fiber filter of Embodiment 1 is measured.

The transmission loss of this optical fiber filter was measured, with these results shown in FIG. 7. The wavelength characteristics were comparatively sharp, while the transmission loss at wavelengths other than the center wavelength was almost 0.

(Example 2)

This example differs from Example 1 above in that a SI fiber was employed for the bare multimode optical fiber 15, the mode field diameter of the LP01 mode of the SI fiber approaching the mode field diameter of LP01 mode of bare single mode optical fiber 22 in size.

In this case, the ratio between the mode field diameter of the LP01 mode of bare multimode optical fiber 15 and the mode field diameter of the LP01 mode of bare single mode optical fiber 15 was 1.1.

The connection loss at the fusion spliced points 24 of this optical fiber filter was 0.3 dB.

Figure 8:
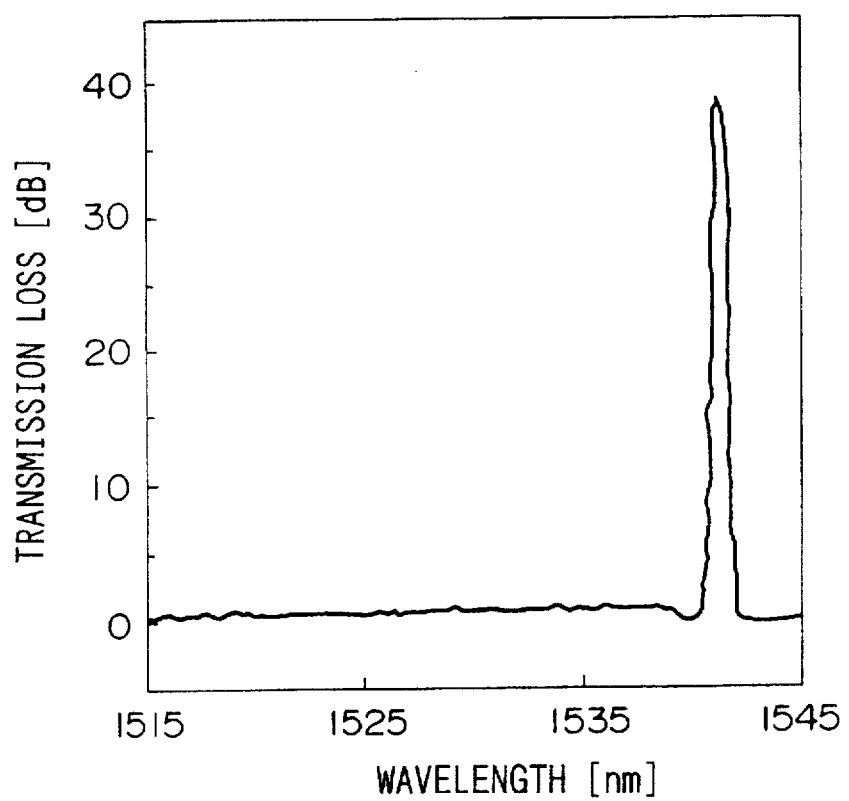
FIG. 8 is a graph showing the results when the transmission loss of the optical fiber filter of Embodiment 2 is measured.

The transmission loss of this optical fiber filter was measured, with these results shown in FIG. 8. The wavelength characteristics were sharp, while the transmission loss at wavelengths other than the center wavelength was almost 0.

(Example 3)

An optical fiber filter having the structure shown in FIG. 2C was produced as described above.

An expanded portion 34 was formed in core 18 of a bare single mode optical fiber 22 by heating at 2000° C. with an oxyhydrogen flame for 2 minutes.

The maximum core diameter of expanded portion 34 was 15 μm, the maximum mode field diameter was 16.2 μm, and the length a of expanded portion 34 was 15 mm.

A GI optical fiber of 30 mm in length was employed as bare multimode optical fiber 15. An optical fiber grating 8 having a length of 10 mm was formed to this bare multimode optical fiber 15.

The ratio between the mode field diameter of bare single mode optical fiber 22 and the mode field diameter of bare multimode optical fiber 15 at fusion spliced points 24 was 1.1.

The connection loss at fusion spliced points 24 of this optical fiber filter was 0.2 dB.

Further, the connection loss was 2.5 dB in the case where a 30 mm GI optical fiber as described above was fusion spliced to a bare single mode optical fiber 22 not provided with an expanded portion 34 in the core thereof.

Figure 9:
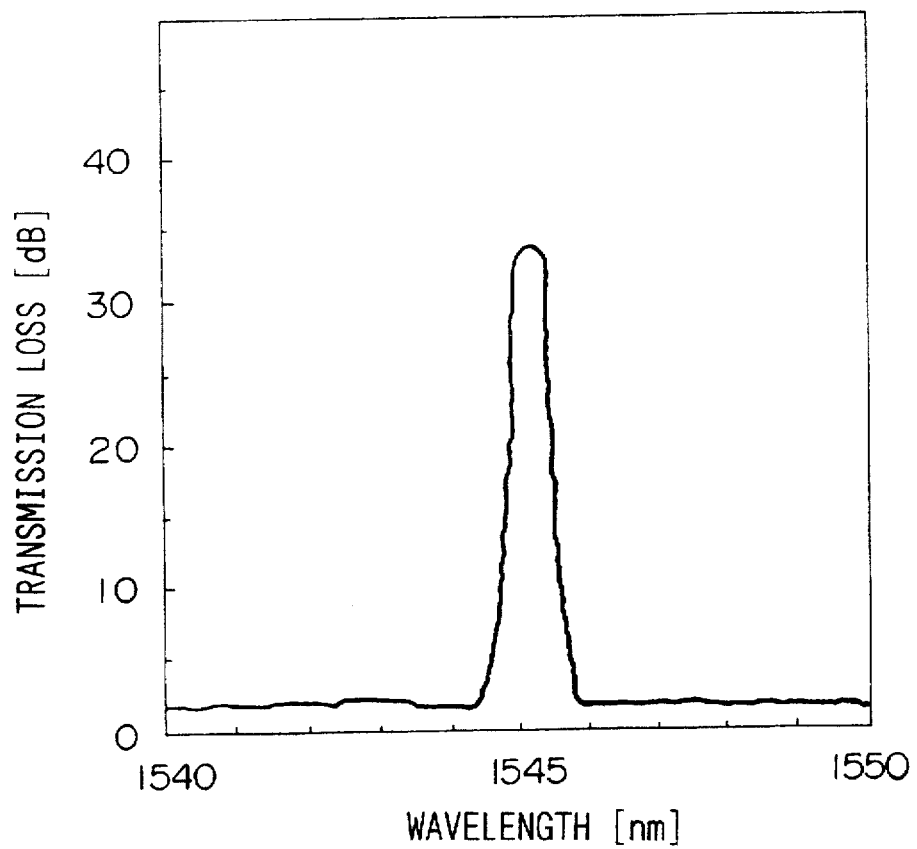
FIG. 9 is a graph showing the results when the transmission loss of the optical fiber filters of Embodiments 3 and 4 is measured.

The transmission loss of this optical fiber filter was measured, with these results shown in FIG. 9. The wavelength characteristics were sharp, while the transmission loss at wavelengths other than the center wavelength was almost 0.

(Example 4)

An optical fiber filter having the structure shown in FIG. 3B was produced as described above.

An expanded portion 34 was formed by heating at 2000° C. for 50 sec using an arc discharge.

The maximum core diameter of expanded portion 34 of core 18 of bare single mode optical fiber 22 was 18 μm, while the maximum mode field diameter thereof was 20 μm. The maximum core diameter of expanded portion 34 of core 12 of bare multimode optical fiber 15 was 65 μm, while the maximum mode field diameter thereof was 21 μm. Thus, the maximum mode field diameters of single mode optical fiber 22 and multimode optical fiber 15 were approximately the same. In addition, the length b of expanded portion 34 was 5 mm.

A GI optical fiber of 30 mm in length was employed as bare multimode optical fiber 15. An optical fiber grating 8 having a length of 10 mm was formed in this bare multimode optical fiber 15.

The connection loss at fusion spliced points 24 of this optical fiber filter was 0.5 dB.

The transmission loss of this optical fiber filter was measured. As in the case of Example 3, this optical fiber filter demonstrated sharp wavelength characteristics as shown in the graph in FIG. 9, with an almost zero transmission loss at wavelengths other than the center wavelength.

Accordingly, the optical fiber filter of Examples 1 through 4 demonstrated sharp transmission loss wavelength characteristics, with almost zero transmission loss at wavelengths other than the center wavelength.

In the optical fiber filter of Example 1, in which the mode field diameter of the bare multimode optical fiber 15 and the mode field diameter of the bare single mode optical fiber 22 do not approach one another in size, the connection loss at fusion spliced points 24 is large. In contrast, in the optical fiber filters of Examples 2 through 4, in which the mode field diameters of the bare multimode optical fiber 15 and the bare single mode optical fiber 22 approach one another in size in at least the vicinity of fusion spliced points 24, the connection loss is small.

(Example 5)

Figure 10:
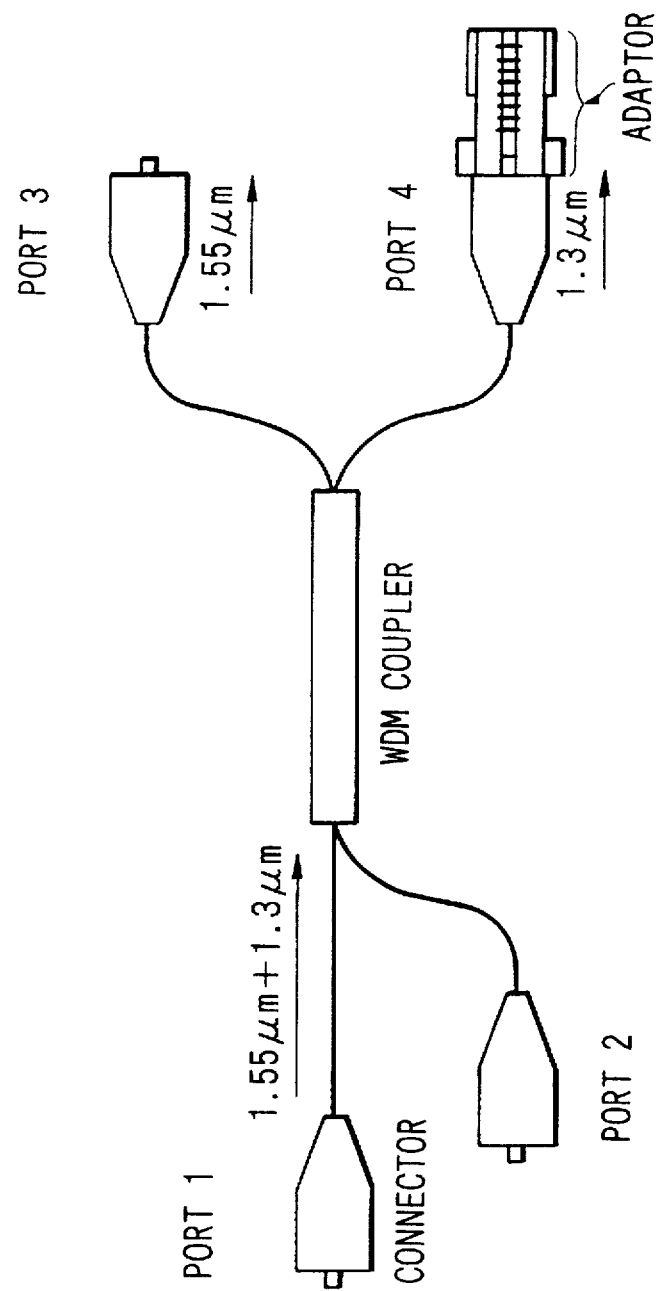
FIG. 10 is a schematic view showing an example of a WDM type optical coupler.
Figure 11A:
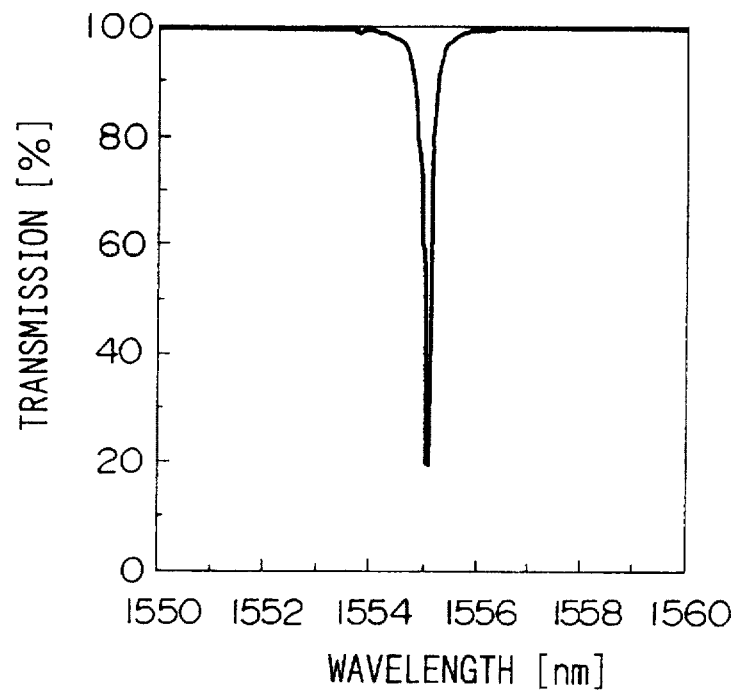
FIG. 11A is a graph showing an example of the relationship between transmission and wavelength, while 11B is a graph showing the relationship between reflectivity and wavelength.
Figure 11B:
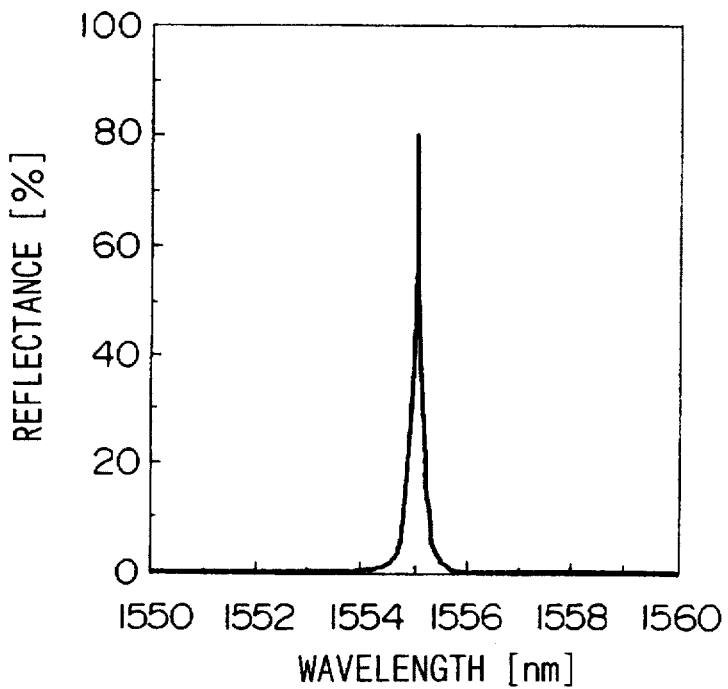
Figure 12:
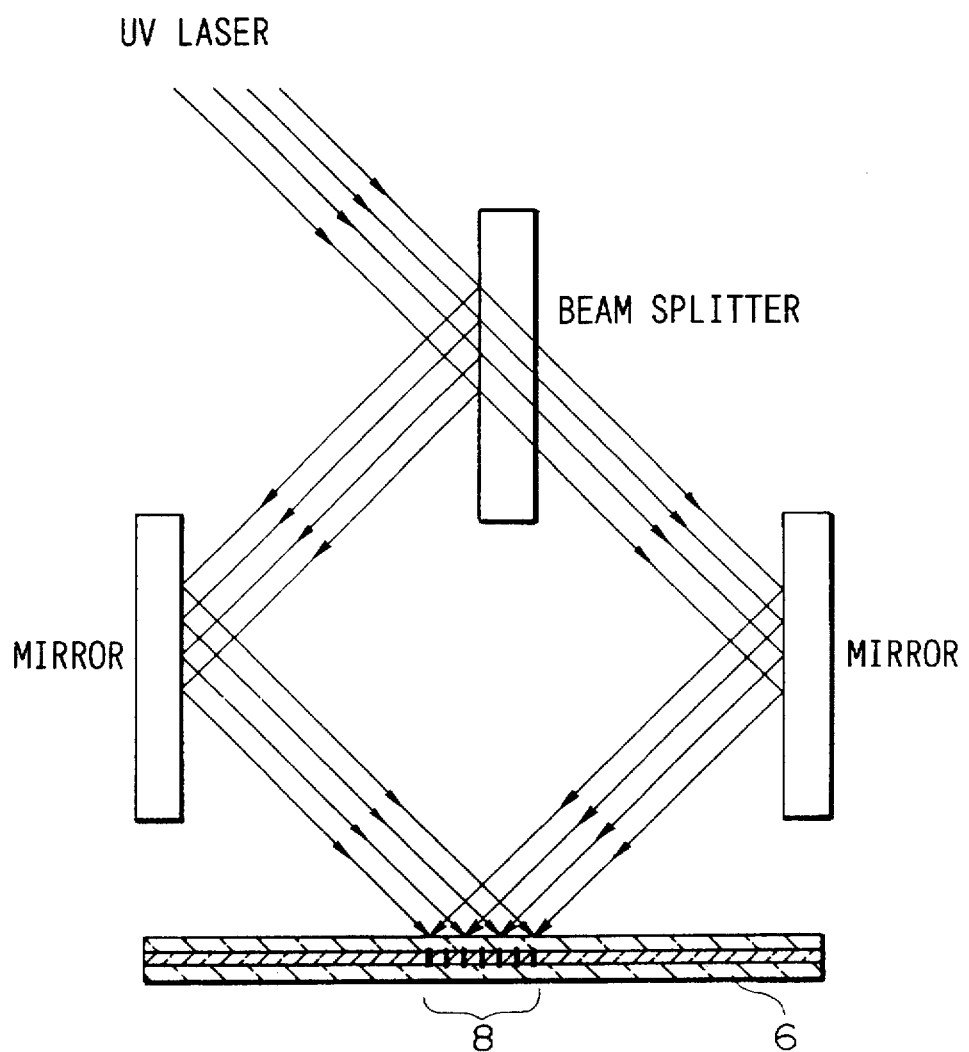
FIG. 12 is an explanatory diagram of an interference exposure method.
Figure 13:
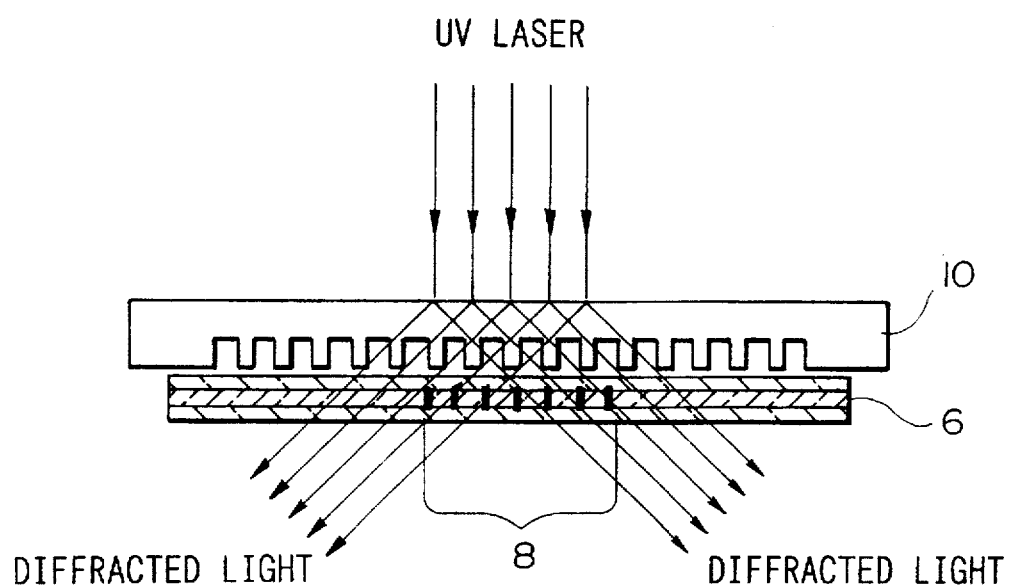
FIG. 13 is an explanatory diagram of a phase mask method.
Figure 14:
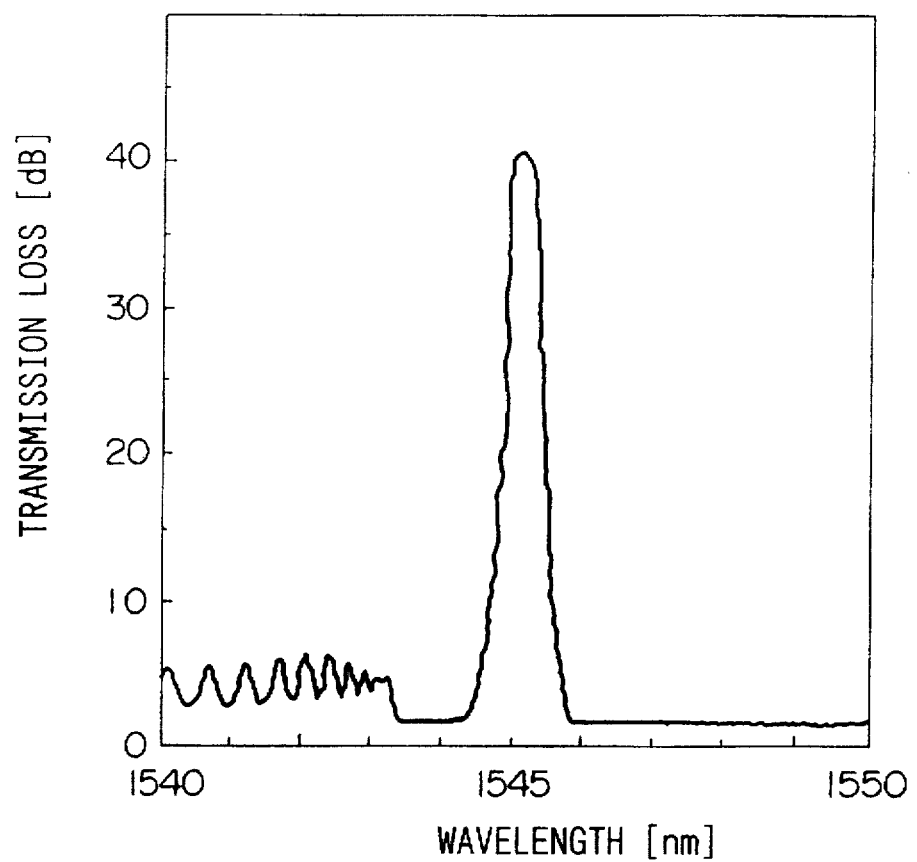
FIG. 14 is a graph showing the relationship between the transmission loss and the wavelength of a conventional optical fiber filter.
Figure 15A:
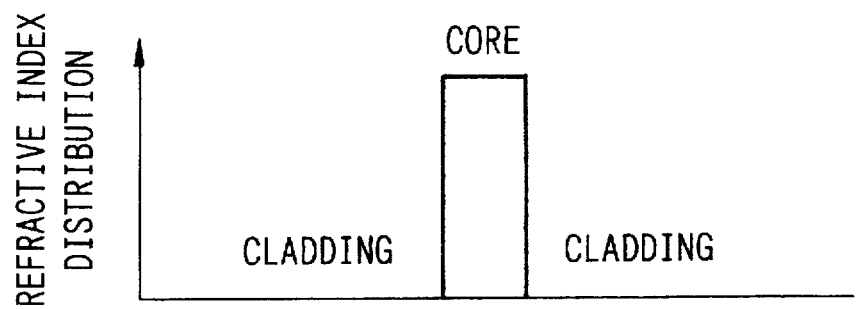
FIGS. 15a)–c) depicts graphs showing the relationship between the refractive index distribution of a single mode optical fiber provided with an optical fiber grating, the optical power distribution of the light propagated through the single mode optical fiber, and the amount of change in the refractive index which has increased due to the formation of an optical fiber grating by irradiating a multimode optical fiber with light from a UV laser.
Figure 15B:
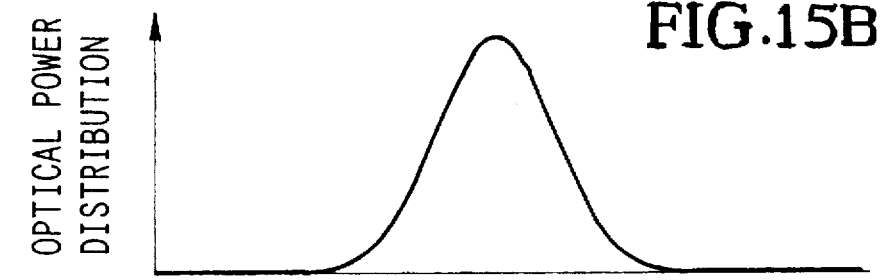
Figure 15C:
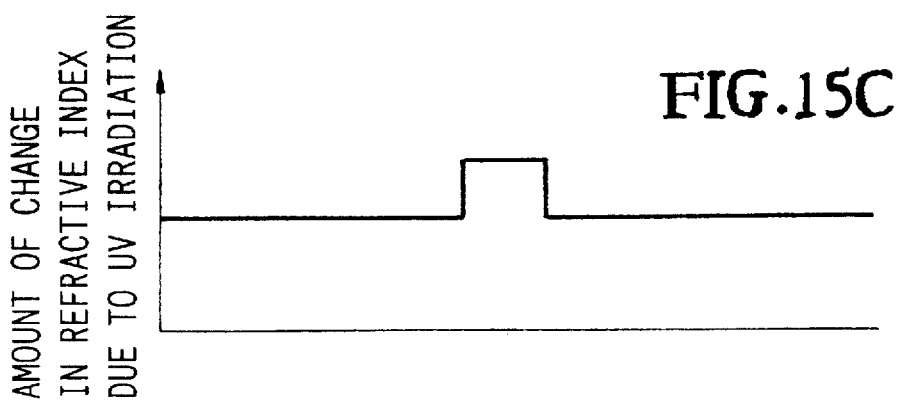

An adaptor housing a multimode optical fiber having a structure as shown in FIG. 5 in which an optical fiber grating was formed was connected to a WDM optical coupler having the structure as shown in FIG. 10. Measurements were then performed on the change in transmission loss due to the connection of an adaptor.

This optical coupler divides light of wavelength 1.55 μm and 1.3 μm input through port 1, emerging light of 1.55 μm from port 3 and light of 1.3 μm from port 4.

In other words, it is preferable that light of wavelength 1.55 μm be selectively reflected at port 4.

The transmission loss of light of 1.5 μm input from port 1 and output from port 4 was measured for the case where the above-described adaptor which selectively reflects light of wavelength 1.55 μm was connected to port 4, and for the case where the adaptor was not connected to port 4. In the case where the adaptor was connected to the port, the transmission loss was 40 dB or more, while when the adaptor was not connected to the port, the transmission loss was approximately 20 dB.

Thus, the optical fiber filter of the present invention demonstrated sufficient effects in practical utilization.

Further, as necessary, this adaptor may be releasable this case, by exchanging only the adaptor, it is possible to respond to a change in the wavelength desired, eliminating the need for exchanging the optical coupler itself.

Further, if it is not necessary that the adaptor be releasable, then, as shown in FIG. 4, a multimode optical fiber having an optical fiber grating may be housed inside the plug port 4, to realize a device which is the same size as an ordinary optical coupler.

In the preceding embodiments, provided that the ratio of the mode field diameter of the LP01 mode of the multimode optical fiber with respect to the mode field diameter of the single mode optical fiber is 1.5 or less, then comparatively sharp transmission wavelength characteristics can be obtained. Further, if this ratio is 1.1 or less, than extremely sharp transmission wavelength characteristics may be obtained.

As a result, when the mode field diameters of the LP01 modes of both optical fibers approach one another in size, the ratio between those mode fields is preferably in the range of 1.0 to 1.5, and even more preferably in the range of 1.0 to 1.1.

What is claimed:

1. An optical fiber filter having a portion which selectively reflects or transmits light of a specific wavelength, wherein:
   the portion for selectively reflecting or transmitting light of a specific wavelength is comprised of a multimode optical fiber in which the refractive index of the core changes periodically along the longitudinal direction thereof;
   the multimode optical fiber having an input end and an output end, wherein at least the input end of the multimode optical fiber is connected to a single mode optical fiber.

2. An optical fiber filter having a portion for selectively reflecting or transmitting light of a specific wavelength, wherein:
   the portion for selectively reflecting or transmitting light of a specific wavelength comprises a multimode optical fiber in which the refractive index of the core changes periodically along the longitudinal direction thereof;
   the multimode optical fiber having an input end and an output end, wherein at least the input end of the multimode optical fiber is connected to an external single mode optical fiber or an external single mode optical waveguide.

3. An optical fiber filter according to claim 1, wherein the mode field diameter of the LP01 mode of the light propagating in the multimode optical fiber, and the mode field diameter of the single mode optical fiber, approach each other in size at least the connection between the multimode optical fiber and the single mode optical fiber.

4. An optical fiber filter according to claim 2, wherein the mode field diameter of the LP01 mode of the light propagating in the multimode optical fiber, and the mode field diameter of the external single mode optical fiber or the external single mode optical waveguide, approach each other in size at least the connection between the multimode optical fiber and the external single mode optical fiber or the external single mode optical waveguide.

5. An optical fiber filter according to claim 3, wherein the connection loss at the connection between the multimode optical fiber and the single mode optical fiber is 1 dB or less at the operation wavelengths of the optical fiber filter.

6. An optical fiber filter according to claim 4, wherein the connection loss at the connection between the multimode optical fiber and the external single mode optical fiber or external single mode optical waveguide is 1 dB or less at the operation wavelengths of the optical fiber filter.

7. An optical fiber filter according to claim 3, wherein the diameter of the core of the single mode optical fiber at the connection between the multimode optical fiber and the single mode optical fiber is enlarged.

8. An optical fiber filter according to claim 4, wherein the diameter of the core of the external single mode optical fiber or the core of the external single mode optical waveguide is enlarged at the connection therebetween.

9. An optical fiber filter according to claim 3, wherein the diameter of the core in the multimode optical fiber and the diameter of the core of the single mode optical fiber are both enlarged at the connection therebetween.

10. An optical fiber filter according to claim 4, wherein the diameter of the core in the multimode optical fiber and the diameter of the core of the external single mode optical fiber or the external single mode optical waveguide are both enlarged at the connection therebetween.

11. An optical fiber filter according to claim 1, wherein the ratio of the mode field diameter of the LP01 mode of light propagating in the multimode optical fiber with respect to the mode field diameter of the single mode optical fiber is in the range of 1.0 to 1.5.

12. An optical fiber filter according to claim 2, wherein the ratio of the mode field diameter of the LP01 mode of light propagating in the multimode optical fiber with respect to the mode field diameter of the external single mode optical fiber or the external single mode optical waveguide is in the range of 1.0 to 1.5.

13. An optical fiber filter according to claim 1, wherein germanium is doped to the core of the multimode optical fiber, and periodical light is irradiated along the longitudinal direction thereof to form periodical changes in the refractive index of the core along the longitudinal direction of the multimode optical fiber.

14. An optical fiber filter according to claim 2, wherein germanium is doped to the core of the multimode optical fiber, and periodical light is irradiated along the longitudinal direction thereof to form periodical changes in the refractive index of the core along the longitudinal direction of the multimode optical fiber.

15. An optical fiber filter according to claim 1, wherein the multimode optical fiber is a graded index optical fiber.

16. An optical fiber filter according to claim 2, wherein the multimode optical fiber is a graded index optical fiber.

17. An optical fiber filter according to claim 1, wherein the multimode optical fiber and the single mode optical fiber are fusion spliced.

18. An optical fiber filter according to claim 2, wherein the multimode optical fiber and the external single mode optical fiber or the external single mode optical waveguide are fusion spliced.

19. An optical fiber filter according to claim 1, wherein the multimode optical fiber is housed in a plug housing of an optical fiber connector.

20. An optical fiber filter according to claim 2, wherein the multimode optical fiber is housed in a plug housing of an optical fiber connector.

21. An optical fiber filter according to claim 1, wherein the multimode optical fiber is housed inside an adaptor housing of an optical fiber connector.

22. An optical fiber filter according to claim 2, wherein the multimode optical fiber is housed inside an adaptor housing of an optical fiber connector.

* * * * *